(12) United States Patent
Obrea et al.

(10) Patent No.: US 9,898,874 B2
(45) Date of Patent: Feb. 20, 2018

(54) METHOD TO CONTROL THE USE OF CUSTOM IMAGES

(75) Inventors: Andrei Obrea, Seymour, CT (US); Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 3043 days.

(21) Appl. No.: 11/142,619

(22) Filed: May 31, 2005

(65) Prior Publication Data

US 2006/0271500 A1    Nov. 30, 2006

(51) Int. Cl.
*G07B 17/00* (2006.01)
*G06Q 20/38* (2012.01)

(52) U.S. Cl.
CPC ... *G07B 17/00733* (2013.01); *G06Q 20/3821* (2013.01); *G07B 17/00435* (2013.01); *G07B 2017/00161* (2013.01); *G07B 2017/00766* (2013.01); *G07B 2017/00782* (2013.01)

(58) Field of Classification Search
USPC .................................................. 705/60, 401
See application file for complete search history.

(56) References Cited

U.S. PATENT DOCUMENTS

| | | | | |
|---|---|---|---|---|
| 5,649,185 | A * | 7/1997 | Antognini et al. | 726/2 |
| 5,801,856 | A * | 9/1998 | Moghadam et al. | 358/527 |
| 6,005,945 | A * | 12/1999 | Whitehouse | 380/51 |
| 6,178,412 | B1 * | 1/2001 | Ratzenberger et al. | 705/408 |
| 6,424,954 | B1 | 7/2002 | Leon | 705/401 |
| 6,907,527 | B1 * | 6/2005 | Wu | 713/176 |
| 2003/0074325 | A1 | 4/2003 | Ryan, Jr. | 705/60 |
| 2003/0161536 | A1 * | 8/2003 | Iwamura et al. | 382/218 |
| 2004/0052400 | A1 * | 3/2004 | Inomata et al. | 382/100 |
| 2005/0114276 | A1 * | 5/2005 | Hunter et al. | 705/408 |

FOREIGN PATENT DOCUMENTS

| | | | | |
|---|---|---|---|---|
| EP | 0782108 A2 | 12/1996 | | G07B 17/00 |
| WO | 2004/012053 A2 | 2/2004 | | |

OTHER PUBLICATIONS

"Performance Criteria for Information-Based Indicia and Security Architecture for Open Ibi Postage Evidencing Systems," United States Postal Service, Jun. 25, 1999.

* cited by examiner

*Primary Examiner* — Tsan-Yu J Huang
(74) *Attorney, Agent, or Firm* — Brian A. Lemm; Charles R. Malandra, Jr.

(57) ABSTRACT

A method of controlling the use of a custom image by a user in a value dispensing system, such as a mail processing system, that enables the system provider to account and charge for the use of the custom image without ever actually receiving the data representing custom image. The method includes steps of receiving a hash generated from at least the custom image at a provider location, such as a data center, generating a digital signature from data including at least the received hash, and transmitting the digital signature and data used to generate the digital signature to the user at a user location. The method may further include additional steps of determining whether the digital signature can be successfully verified, and allowing the custom image to be printed by the user only if it is determined that the digital signature can be successfully verified.

7 Claims, 3 Drawing Sheets

METHOD TO CONTROL THE USE OF CUSTOM IMAGES

The present application is related to co-pending, commonly owned U.S. patent application Ser. No.: 11/142,618, filed May 31, 2005, entitled SYSTEM AND METHOD FOR RELIABLE TRANSFER OF VIRTUAL STAMPS, which is incorporated herein by reference in its entirety.

FIELD OF THE INVENTION

The present invention relates to a method for printing information on a mailpiece, and, in particular, to a method for printing custom images on a mailpiece and accounting for the printing of such custom images.

BACKGROUND OF THE INVENTION

Postage metering systems are well known in the art. A postage metering system applies evidence of postage, commonly referred to as postal indicia, to an envelope or other mailpiece (directly or on a label to be applied thereto) and accounts for the value of the postage dispensed.

Presently, there are two basic postage metering system types: closed systems and open systems. In a closed system, the system functionality is solely dedicated to postage metering activity. Examples of closed metering systems include conventional digital and analog (electronic and mechanical) postage meters wherein a dedicated printer is securely coupled to a metering or accounting function. In a closed system, since the printer is securely coupled and dedicated to the meter, printing evidence of postage cannot take place without accounting for the evidence of postage. In an open system, the printer is not dedicated to the metering activity, freeing system functionality for multiple and diverse uses in addition to the metering activity. Examples of open metering systems include personal computer (PC) based devices with single/multi-tasking operating systems, multi-user applications and digital printers. An open system metering device is a postage evidencing device with a non-dedicated printer that is not securely coupled to a secure accounting module. Open system indicia printed by the non-dedicated printer are made secure by including addressee information in the encrypted evidence of postage printed on the mailpiece for subsequent verification.

Conventional analog closed system postage meters (both electronic and mechanical) have heretofore physically secured the link between printing and accounting. The integrity of the physical meter box has been monitored by periodic physical inspections of the meters. Digital closed system postage meters typically include a dedicated digital printer coupled to a device that provides metering (accounting) functionality. Digital printing postage meters have removed the need for the physical inspection that was required with analog systems by cryptographically securing the link between the accounting and printing mechanisms. In essence, digital printing postage meters create a secure point to point communication link between the accounting unit and printhead.

In such digital closed systems, the dedicated printer and the metering (accounting) device may be located in the same device and/or at the same location when placed in operation. Alternatively, the dedicated printer may be located in a first location (i.e., the local location where indicia are to be printed), and the metering (accounting) device may be located in a remote location, such as a provider's data center. In the latter situation, it is still necessary for the dedicated printer to be a secure device having cryptographic capabilities so that postage printing information, such as an indicium, received from the metering (accounting) device, and the metering (accounting) device itself, can be authenticated.

Many postage metering system users desire to have the ability to print an image on the mailpiece (or label) in conjunction with the indicium that is printed. For example, the image may be a predetermined image that is selected and obtained (such as from a catalog or the like) from the postage metering system provider. In such a case, the provider is able to control the images that are available for use, and thus can take steps to prevent the use of copyrighted and/or offensive images. In addition, when predetermined provider images are used, the provider can account for the use of such images and therefore charge a fee to users for use of what is considered to be a premium service. Some users, however, desire to have the ability to print custom images that they either create themselves or obtain form a third party source. Custom images, however, present a problem as they are not as readily controlled by the provider, and thus it is difficult to prevent the use of copyrighted and/or offensive images. Furthermore, for various reasons, in situations where a custom image is to be used, it is preferred that the custom image (i.e., the data representing the custom image) never actually be received and physically possessed by the provider. This, however, limits the ability of a provider to account for, and thus charge the customer for, the use of the custom image. Thus, there is a need for a system that enables a provider to account and charge for the use of a custom image wherein the provider never actually receives the data representing custom image.

SUMMARY OF THE INVENTION

The present invention relates to a method of controlling the use of a custom image by a user in a value dispensing system, such as a mail processing system, that enables the system provider to account and charge for the use of the custom image without ever actually receiving the data representing the custom image. The method includes steps of receiving a hash generated from at least the custom image at a provider location, such as a data center, generating a digital signature from data including at least the received hash, accounting for the use of the custom image by the user so that, for example, the user can be charged a fee for the right to use the custom image, and transmitting the digital signature and data used to generate the digital signature to the user at a user location. Preferably, the digital signature is generated from at least the hash and a custom image identifier for the custom image, and the transmitting step further includes transmitting the digital signature and at least the hash and the custom image identifier to the user location. The custom image identifier is preferably generated at the provider location. Alternatively, the custom image identifier may be generated at the user location, such as by a user's PC or printer, and transmitted to the provider location. In addition, the method may further include additional steps of determining whether the custom image has been disallowed, and allowing the custom image to be printed by the user only if it is determined that the custom image has not been disallowed. In addition, the method may further include determining that the custom image should no longer be used because, for example, it is copyrighted material or is offensive, and subsequently transmitting a signal from the provider location to the user location that prevents future printing of the custom image by the user. The method may also further include comparing the hash to one or more second hashes, each of which is generated from at least an image provided to the provider by a third party, and performing the generating, accounting and transmitting steps only if the hash does not match any of the one or more second hashes. Alternatively, the transmitting step may further include transmitting a message to the user location indicating a third party claim of ownership to the custom image if the hash matches any of the one or more second hashes.

The present invention also relates to a method of controlling the printing of a custom image at a user location in a value dispensing system, such as a mail processing system, that is operated by a provider wherein the provider has previously transmitted a digital signature to the user location. The digital signature is, in this aspect of the invention, generated from at least a hash of the custom image previously submitted by the user. The method further includes determining whether the digital signature can be successfully verified, and allowing the custom image to be printed by the user only if it is determined that the digital signature can be successfully verified. In the preferred embodiment, the digital signature is generated from at least the first hash and a custom image identifier for the custom image.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
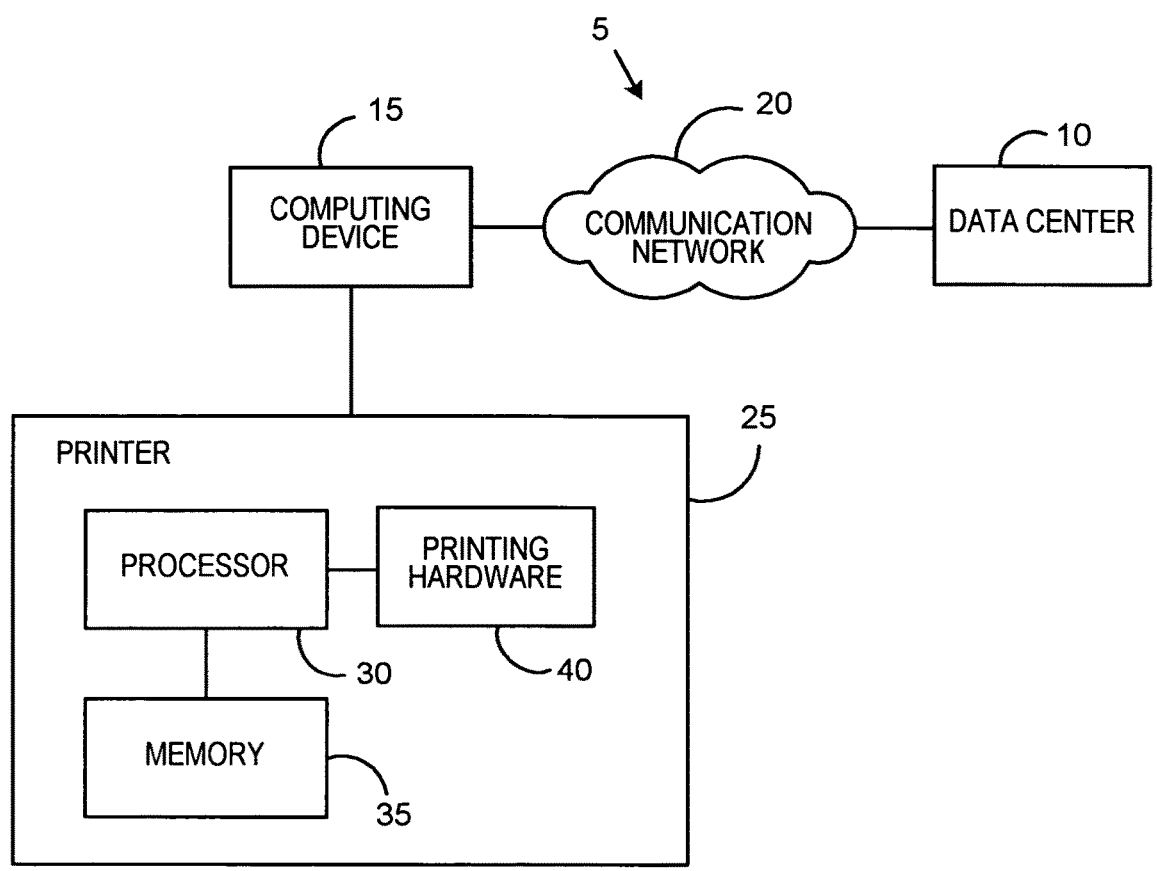
FIG. 1 is a block diagram of one embodiment of a mail processing system according to the present invention.

FIG. 1 is a block diagram of mail processing system 5 according to one particular embodiment of the present invention. As described in greater detail below, mail processing system 5 enables a user to print custom images on a mailpiece or a label to be applied to a mailpiece, and accounts for (and enables the customer to be charged for) the use of the custom image without the provider ever actually receiving the custom image itself. It should be understood that mail processing system 5 is just one particular embodiment of a mail processing system in which the present invention may be implemented, and that the invention as described herein may also be implemented in other open or closed mail processing systems such as those described above.

Mail processing system 5 includes a data center 10 that includes a suitable processing system having a computing device such as a server computer and one or more memory components for data storage. The data center 10 is in electronic communication with one or more remotely located computing devices 15 (only one computing device 15 is shown in FIG. 1 for purposes of clarity of description) over any suitable communication network 20 such as the Internet. Each computing device 15 may be, for example, a personal computer, a workstation, a laptop computer, a personal data assistant, a cell phone, or the like. Generally, it is anticipated that the computing devices 15 would be located in, for example, small business offices and/or in private residences and used for a variety of purposes, including obtaining and printing postal indicia as described herein. The data center 10 is maintained and operated by a provider such as an authorized postage meter manufacturer or some other authorized agency. As seen in FIG. 1, computing device 15 is in electronic communication with a printer 25 that includes a processor 30, such as a microcontroller, a memory 35, and printing hardware 40, such as an ink jet print head and associated print controller, that enables the printing of indicia and images. Memory 35 may be any of a variety of internal and/or external storage media including RAM, ROM, EPROM, EEPROM, and/or the like, alone or in combination. Memory 35 stores one or more routines executable by processor 30 for the processing of data in accordance with the invention as described herein. The routines can be in any of a variety of forms such as, without limitation, software, firmware, and the like, and may include one or more subroutines, processes, procedures, function calls or the like, alone or in combination.

Printer 25, in the particular embodiment shown in FIG. 1, is a secure postage printing device that is able to print USPS IBIP closed system indicia along with images, preferably near-photo quality gray-scale or color images, on a mailpiece or an adhesive label to be applied to a mailpiece. Memory 35 is able to store evidence of postage payment, as described below, and images that are to be printed. In the embodiment shown in FIG. 1, printer 25 does not include a postal security device (PSD), but instead prints indicia that were previously dispensed by an approved PSD associated with data center 10 for specific postage denominations. It will be appreciated, however, that other alternatives are possible, including embodiments where a PSD is located at the customer site. In operation, a user sends a request to purchase postage from computing device 15 to data center 10 through communication network 20. Specifically, computing device 15 generates a request for a particular number of indicia for one or more particular postage denominations (e.g., twenty $0.37 indicia and twenty $0.74 indicia). In response, the data center 10 generates an appropriate number of postage data records (one for each requested indicium) and securely transmits them (e.g., using an SSL connection) to computing device 15 over communication network 20. Preferably, the postage data records are encrypted using a secret key that is assigned to the particular printer 25 in question and are digitally signed by the data center 10 before being sent to computing device 15. By encrypting the postage data records, data center 10 is able to ensure that only the particular requesting printer 25 may ultimately use the postage data records that were sent. When received, the postage data records are downloaded from the computing device 15 to the printer 25 where they are stored in memory 35 until used by the user to create an indicium that is printed on a mailpiece or a label. Once the postage data records (and any images to be printed along with indicia) are stored in memory 35, printer 25 may be detached from computing device 15 and used as a stand alone postage dispensing device. Thus, in the mail processing system 5 shown in FIG. 1, printer 25 performs the postage printing function only, and postage dispensing and accounting functions are performed by data center 10.

Figure 2:
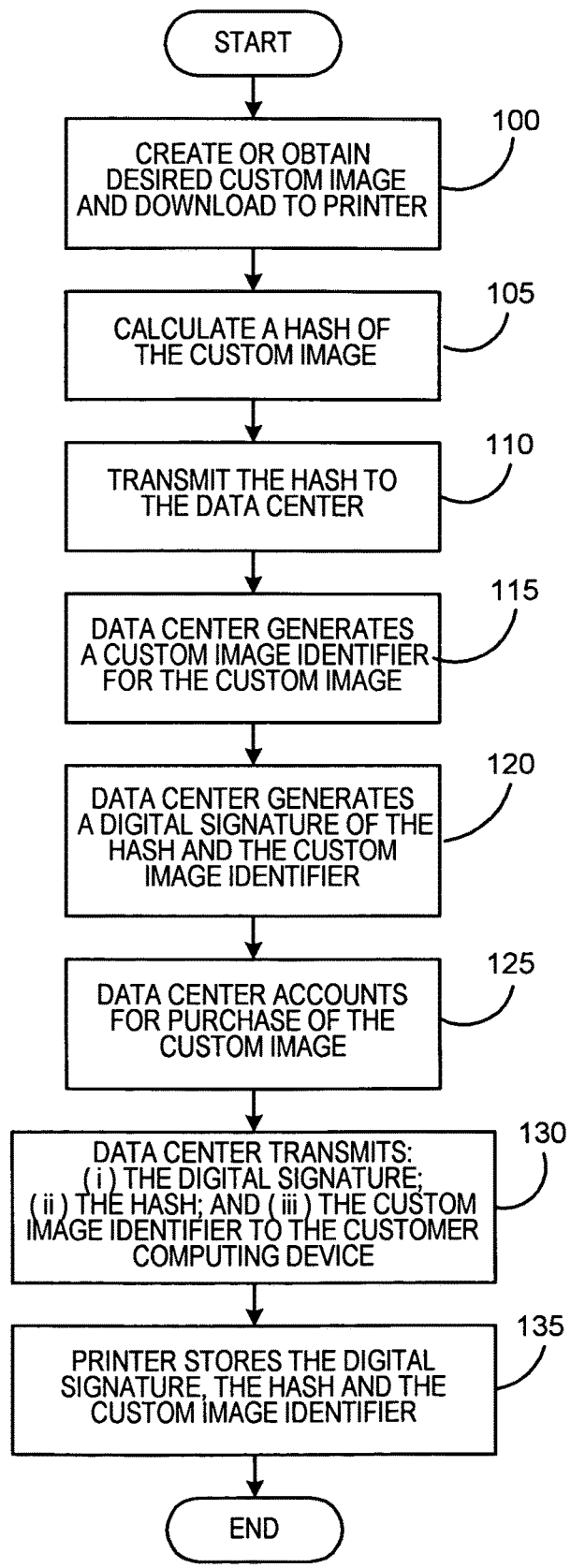
FIGS. 2 and 3 are flowcharts illustrating the operation of a mail processing system according to the present invention which enables and accounts for the printing of custom images on a mailpiece or a label to be applied to a mailpiece.

As described above, mail processing system 5 enables a user to print images, including the user's custom images, on a mailpiece or a label to be applied to a mailpiece. In the case of custom images, mail processing system 5 also enables a provider (the entity operating data center 10) to account for and charge for the use of the custom image without ever actually receiving the custom image itself (i.e., the data representing the custom image). When used herein, the term "custom image" shall be understood to include and refer to the data that represents the image. FIG. 2 is a flowchart illustrating one embodiment of a method for purchasing the right to use a custom image according to the present invention. The method begins at step 100, where a user of computing device 15 and printer 25 uses computing device 15 to either create or obtain from a third party source the custom image that he or she wishes to print along with indicia using printer 25. The custom image is then downloaded to printer 25 where it is stored in memory 35. The custom image may not, however, actually be printed in conjunction with an indicium until the custom image is accounted for by the provider in the manner described below.

Next, at step 105, printer 25 calculates a hash of the custom image using a hash function such as, without limitation, the SHA-1 or MD5 algorithms. As will be appreciated, the hash may alternatively be generated by computing device 15. At step 110, the hash is transmitted from the computing device 15 to the data center 10 through communication network 20. Then, at step 115, data center 10 generates a custom image identifier, such as a unique serial number or the like, that uniquely identifies the custom image. Preferably, the custom image identifier includes data that uniquely identifies printer 25, such as the serial number assigned to the printer 25, so that the custom image identifier can be distinguished from any other identifiers associated with other printers 25 in mail processing system 5. Next, at step 120, after receiving the hash and generating the custom image identifier, the data center 10 generates a digital signature of the combination of the custom image identifier and the hash. In particular, the data center 10 possesses a provider public/private key pair. As is known, a digital signature of a piece of data X consists of a hash, preferably a one-way hash, of the data X that is combined with a particular private key using a cryptographic algorithm. Thus, at step 120, the data center 10 creates the digital signature by first creating a hash of the combination of the custom image identifier and the hash received from computing device 15 and then employs a cryptographic algorithm to combine that hash with the private key of the data center 10. At step 125, the data center then accounts for the purchase of the custom image (i.e., the right to use it) so that the user can be charged appropriately. The data center 10 may also store the custom image identifier and the hash received from computing device 15 for subsequent use as described elsewhere herein. As a further alternative, the custom image identifier may be created by the printer 25 or computing device 15 and sent to the data center along with the hash. Next, at step 130, the data center 10 transmits the digital signature created in step 125, the custom image identifier and the hash of the custom image received from the computing device 15 to computing device 15 through communication network 20. As shown in step 135, the received digital signature, hash and custom image identifier are downloaded to the printer 25 and stored in memory 35. Thus, according to the method shown in FIG. 2, the data center 10 is able to account for and charge for each custom image without ever receiving the custom image itself.

Figure 3:
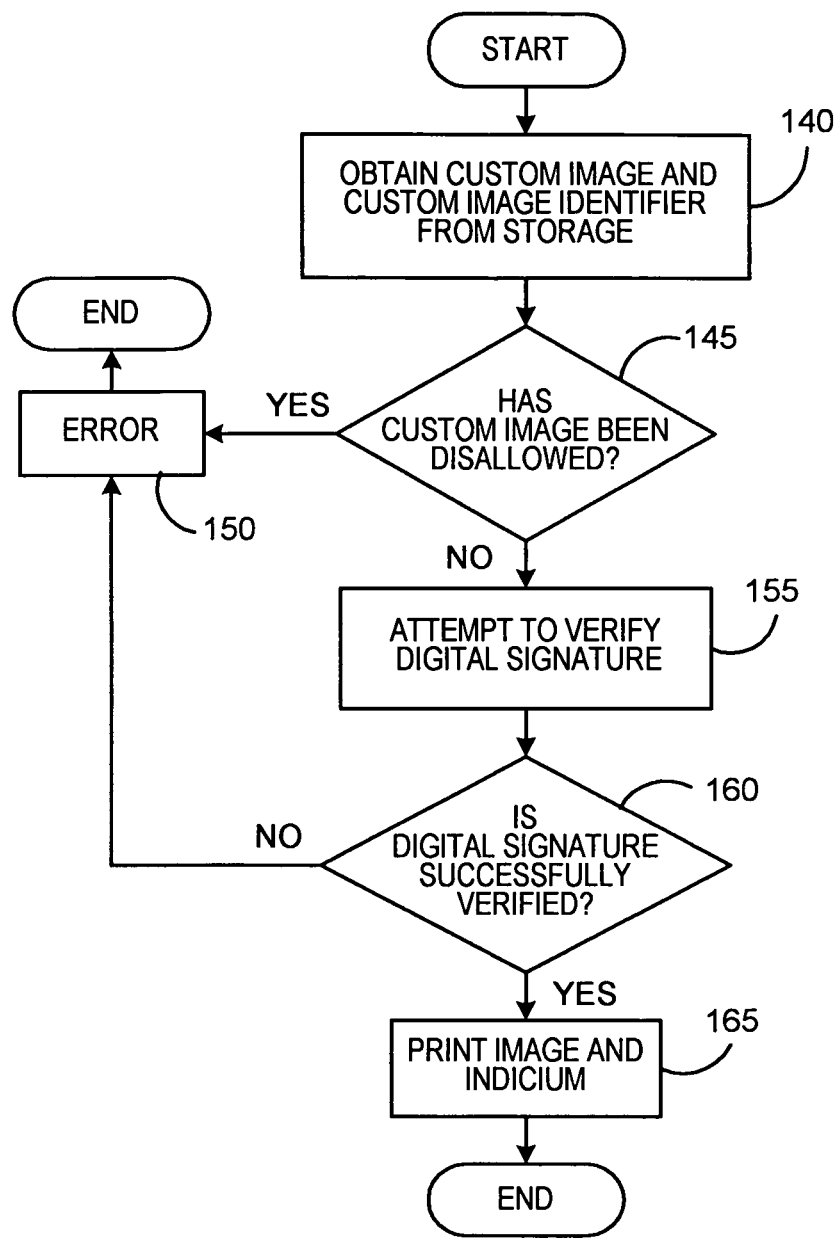

FIG. 3 is a flowchart illustrating one embodiment of a method for printing a custom image (that has been "paid for," i.e., accounted for by the provider) along with an indicium on a mailpiece or label to be applied to a mailpiece according to the present invention. The method begins at step 140, where the printer 25 obtains the custom image and the associated custom image identifier from memory 35. As an alternative, the custom image may be stored in the memory of and downloaded from the computing device 15. Next, at step 145, a determination is made as to whether the custom image identifier is on the list of disallowed images, described in greater detail below, stored by printer 25 or computing device 15. If the answer at step 145 is yes, then at step 150 an error message is provided to the user, such as on a display provided as part of printer 25, that indicates to the user that the custom image in question cannot be used, in this case because it has been disallowed by the data center 10. If, however, the answer at step 145 is no, meaning that the custom image has not been disallowed, then, at step 155, the printer 25 attempts to verify the digital signature previously received from data center 10 and stored in memory 35 that is associated with the custom image in question. As is known, printer 25 does so by combining the digital signature, the stored hash of the custom image and the stored custom image identifier (the latter two being used in the generation of the digital signature) with the public key of the data center 10 (preferably obtained from and/or authenticated by a trusted source such as a certificate authority) using a corresponding cryptographic algorithm. If the result of the algorithm at step 160 is an indication that the signature is invalid, then the method proceeds to step 150 to provide an error message to the user because the approval from the data center 10 cannot be verified. If, however, the result of the algorithm at step 160 is an indication that the signature is valid, then, at step 165, printer 25 stores the image in memory 35 for subsequent printing with an indicium. Alternatively, the printer 25 may immediately print the custom image along with an indicium (based on a previously received and stored postage data record) on a mailpiece or a label to be applied to a mailpiece. According to the preferred embodiment of the invention, the custom image identifier, or a portion of the identifier (e.g., the portion of the image identifier that contains the printer serial number may be omitted since the serial number may be determined in other ways) is printed along with the image in either human or machine readable form for subsequent identification purposes. Alternatively, printing of the image identifier may be omitted.

According to a further aspect of the present invention, data center 10 stores each of the hashes and each of the corresponding custom image identifiers that are received from users. If the provider is subsequently informed that or otherwise learns that a particular image is being used improperly, e.g., it is copyrighted material being used without authorization or it is offensive in nature, then the provider can take steps to prevent future use of the custom image. Specifically, the provider can "disable" such an image by placing it on, for example, a disallowed image list identified by the corresponding customer identification number. Then, each time that a user contacts data center 10, the data center 10 can send the current disallowed image list to the user's printer 25 for storage thereby and for subsequent use as described in connection with steps 145 of FIG. 3.

According to yet a further aspect of the invention, the provider can provide a service to third parties to prevent the unauthorized use of protected images, such as their logos or the like. In particular, a third party can provide the provider with a logo, and each time a user submits a custom image for approval as described herein, the submitted hash can be compared to a hash of the logo and the submitted custom image identifier. If a match is found, then the provider can refuse to "approve" use of the custom image (i.e., by not sending the required digital signature back to the user), or can inform the user that the custom image they are attempting to use is claimed to be protected by a third party, and therefore they should use it at their own risk.

Thus, the present invention provides a system wherein a user can purchase the ability to print custom images from a provider and the provider can account and charge for the use of custom images without the provider ever actually receiving the custom image (the provider only receives a hash of the custom image). As a result, the provider will never have knowledge of the content of any of the custom images used by customers, and thus cannot be charged with knowledge that a customer is using a custom image that violates a third party' rights or that is offensive. In addition, the system of the invention ensures that a user cannot print a custom image without first having obtained approval from the provider (meaning the provider has accounted for the custom image). The invention further ensures that the provider can disable images should the need arise.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. For example, as stated above, FIGS. 1, 2 and 3 represent one particular embodiment of the invention, and it should be understood that the invention as claimed may be implemented in a number of different mail processing systems, including various known open and closed systems. In addition, the concepts of the present invention are not limited to application in the area of postal indicia printing, but may also be used in connection with the printing of any type of indication of value in a value dispensing system, such as, for example, ticketing systems and digital content delivery rights management systems. Accordingly, the invention is not to be considered as limited by the foregoing description but is only limited by the scope of the appended claims.

The invention claime is:

1. A method of controlling the use of a custom image by a user at a user location in a mail processing system, said mail processing system being operated by a provider, comprising:

receiving, by a processing device at a provider location remote from said user location, a hash of the custom image, wherein said provider location and user location are operatively connected by a network for a portion of time, said hash being generated from said custom image at the user location and said custom image stored at the user location and not transmitted to the provider location;

assigning, by the processing device, a unique custom image identifier to the custom image, wherein the unique custom image identifier is uniquely associated with the user;

storing, by the processing device, said hash of the custom image and said unique custom image identifier in a memory at said provider location;

generating, by the processing device, a digital signature at said provider location, said digital signature being generated solely from said hash, said unique custom image identifier, and a provider cryptographic key;

transmitting, by the processing device, said unique custom image identifier, said digital signature and said hash to said user location;

receiving said digital signature at said user location;

determining whether said digital signature can be successfully verified; and allowing said custom image to be printed by said user only if it is determined that said digital signature can be successfully verified.

2. The method according to claim 1, further comprising accounting for the use of said custom image by said user.

3. The method according to claim 1, wherein said receiving step further comprises receiving said custom image identifier at said provider location from said user location, said custom image identifier being generated at said user location.

4. The method according to claim 1, further comprising generating said custom image identifier at said provider location.

5. The method according to claim 1, further comprising determining that said custom image should no longer be used, and transmitting information from said provider location to said user location that prevents future printing of said custom image by said user.

6. The method according to claim 1, further comprising comparing said hash to one or more second hashes, each of said second hashes being generated from an image provided to said provider by a third party, and performing said generating and transmitting steps only if said hash does not match any of said one or more second hashes.

7. The method according to claim 1, further comprising comparing said hash to one or more second hashes, each of said second hashes being generated from an image provided to said provider by a third party, said transmitting step further comprising transmitting a message to said user location indicating a third party claim of ownership to said custom image if said hash matches any of said one or more second hashes.

* * * * *